US009383976B1

(12) United States Patent
Singh et al.

(10) Patent No.: US 9,383,976 B1
(45) Date of Patent: Jul. 5, 2016

(54) METHODS AND SYSTEMS FOR CROWDSOURCING SOFTWARE DEVELOPMENT PROJECT

(71) Applicant: XEROX CORPORATION, Norwalk, CT (US)

(72) Inventors: Atul Singh, Bangalore (IN); Vaibhav Rajan, Bangalore (IN); Koustuv Dasgupta, Bangalore (IN); Nischal Murthy Piratla, Fremont, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/597,320

(22) Filed: Jan. 15, 2015

(51) Int. Cl.
G06F 9/44 (2006.01)
H04L 12/18 (2006.01)
G06F 11/36 (2006.01)
G06Q 10/06 (2012.01)

(52) U.S. Cl.
CPC .. *G06F 8/34* (2013.01); *G06F 8/70* (2013.01); *G06F 11/3688* (2013.01); *G06Q 10/06* (2013.01); *H04L 12/1822* (2013.01)

(58) Field of Classification Search
CPC .... G06F 11/3688; G06F 8/70; H04L 12/1822
USPC .......................................................... 717/103
See application file for complete search history.

(56) References Cited

U.S. PATENT DOCUMENTS

| 7,778,866 | B2 * | 8/2010 | Hughes | G06F 8/20 705/7.42 |
| 7,849,438 | B1 * | 12/2010 | Hemmat | G06Q 10/06 717/102 |
| 8,776,042 | B2 * | 7/2014 | Hughes | G06F 8/20 717/168 |
| 8,972,372 | B2 * | 3/2015 | Elbaum | G06F 17/30864 707/706 |
| 2007/0220479 | A1 * | 9/2007 | Hughes | G06Q 30/02 717/100 |
| 2007/0250378 | A1 * | 10/2007 | Hughes | G06Q 30/02 705/7.42 |
| 2008/0086354 | A1 * | 4/2008 | Nagar | G06Q 10/06311 705/7.13 |
| 2008/0263505 | A1 * | 10/2008 | StClair | G06F 8/10 717/101 |
| 2009/0192849 | A1 * | 7/2009 | Hughes | G06F 8/10 705/7.11 |
| 2009/0203413 | A1 * | 8/2009 | Jefts | A63F 9/18 463/9 |
| 2011/0154224 | A1 * | 6/2011 | Bates | G06Q 10/10 715/758 |
| 2011/0313801 | A1 * | 12/2011 | Biewald | G06Q 10/0631 705/7.12 |
| 2013/0046585 | A1 * | 2/2013 | Bang | G06Q 10/06 705/7.38 |

(Continued)

OTHER PUBLICATIONS

Archak, Money, Glory and Cheap Talk: Analyzing Strategic Behavior of Contestants in Simultaneous Crowdsourcing Contests on TopCoder.com, Applicant Supplied Prior Art (2010).*

(Continued)

*Primary Examiner* — Lewis A Bullock, Jr.
*Assistant Examiner* — Theodore Hebert

(57) ABSTRACT

The disclosed embodiments illustrate methods and systems for crowdsourcing a software development project. The method includes segregating the software development project into one or more modules based on at least one configuration file. The at least one configuration file is deterministic of at least a set of dependencies between the one or more modules. Further, a task corresponding to at least one module from the one or more modules is created. The task is crowdsourced to one or more crowdworkers. Thereafter, a source code of the at least one module, received as a response for the task, is integrated with one or more source codes of remaining of the one or more modules to generate an integrated software package based on said at least one configuration file. Further, the integrated software package is validated by performing integration testing of the integrated software package.

22 Claims, 10 Drawing Sheets

(56) References Cited

U.S. PATENT DOCUMENTS

| | | | | |
|---|---|---|---|---|
| 2013/0074051 A1* | 3/2013 | Freeman | ............. | G06F 11/3466 717/130 |
| 2013/0263084 A1* | 10/2013 | Kesavan | ............ | G06F 17/30864 717/106 |
| 2014/0047413 A1* | 2/2014 | Sheive | ................. | H04L 65/403 717/110 |

OTHER PUBLICATIONS

Tran-Thanh, Efficient Crowdsourcing of Unknown Experts using Bounded Multi-Armed Bandits, Applicant Supplied Prior Art (May 2, 2014).*

"Money, Glory and Cheap Talk: Analyzing Strategic Behavior of Contestants in Simultaneous Crowdsourcing Contests on TopCoder. com", Nikolay Archak, New York University, Leonard N. Stern School of Business, pp. 1-10.

[Faridani] Faridani, Siamak, Hartmann, BJorn, and Ipeirotis,Panagiotis G. Whats the right price? pricing tasks for finishing on time. In Proc. of AAAI Workshop on Human Computation, 2011.

[Karger] David R Karger, Sewoong Oh, Devavrat Shah, Iterative Learning for Reliable Crowdsourcing Systems, NIPS 2011: 1953-1961.

[Minder] Patrick Minder, Sven Seuken, Abraham Bernstein, Mengia Zollinger, CrowdManager—Combinatorial Allocation and Pricing of Crowdsourcing Tasks with Time constraints, Workshop on Social Computing and User generated content, 2012.

[Tran] Long Tran-Thanh, Sebastien Stein, Alex Rogers, Nicholas R. Jennings, Efficient Crowdsourcing of Unknown Experts using Multi-Armed Bandits, ECAI 2012: 768-773.

Chien-Ju Ho and Jennifer Wortman Vaughan—"Online Task Assignment in Corwdsourcing Markets", Copyright c 2012, Association for the Advancement of Artificial Intelligence (www.aaai.org).

* cited by examiner

```
<?xml version="1.0" encoding="UTF-8"?>
    <beans xmlns="http://www.springframework.org/schema/beans"
    xmlns:xsi="http://www.w3.org/2001/XMLSchema-instance"
        xsi:schemaLocation="http://www.springframework.org/schema/beans
        http://www.springframework.org/schema/beans/spring-beans.xsd'>

<bean id="frontend" class="TextEditorFrontEnd">
<property name="iBackend" ref="backend"/>
<bean>

<bean id="backend" class="TextEditorBackEnd">
< !-- other definitions -->
<beans>
```
410

FIG. 4B

METHODS AND SYSTEMS FOR CROWDSOURCING SOFTWARE DEVELOPMENT PROJECT

TECHNICAL FIELD

The presently disclosed embodiments are related, in general, to crowdsourcing. More particularly, the presently disclosed embodiments are related to methods and systems for crowdsourcing software development project.

BACKGROUND

Crowdsourcing is the outsourcing of work or tasks by a requestor such as an individual or an enterprise, to groups of loosely bound individuals, also known as crowdworkers. With the advancement of telecommunication technology and the penetration of internet among the masses, crowdsourcing has emerged as an attractive means for the requestors to get their work or tasks completed through crowdworkers. However, various types of tasks such as development of software applications are difficult to crowdsource. This is due to complexity involved in development of software applications, which stems from an inter-relationship between various modules or code segments that are to be developed. Hence, to leverage the benefits of crowdsourcing for software development, there exists a need for simplifying the process of software development through crowdsourcing. Further, integration and assembling of various code segments developed through crowdsourcing need to be simplified.

SUMMARY

According to embodiments illustrated herein, there is provided a method for crowdsourcing a software development project. The method includes segregating, by one or more processors, the software development project into one or more modules based on at least one configuration file. The at least one configuration file is deterministic of at least a set of dependencies between the one or more modules. Further, a task corresponding to at least one module from the one or more modules is created. The task is crowdsourced to one or more crowdworkers. Thereafter, a source code of the at least one module, received as a response for the task, is integrated with one or more source codes of remaining of the one or more modules to generate an integrated software package based on said at least one configuration file. Further, the integrated software package is validated by performing integration testing of the integrated software package.

According to embodiments illustrated herein, there is provided a system for crowdsourcing a software development project. The system includes one or more processors that are configured to segregate the software development project into one or more modules based on at least one configuration file. The at least one configuration file is deterministic of at least a set of dependencies between the one or more modules. Further, a task corresponding to at least one module from the one or more modules is created. The task is crowdsourced to one or more crowdworkers. Thereafter, a source code of the at least one module, received as a response for the task, is integrated with one or more source codes of remaining of the one or more modules to generate an integrated software package based on said at least one configuration file. Further, the integrated software package is validated by performing integration testing of the integrated software package.

According to embodiments illustrated herein, there is provided a computer program product for use with a computing device. The computer program product comprises a non-transitory computer readable medium, the non-transitory computer readable medium stores a computer program code for crowdsourcing a software development project. The computer readable program code is executable by one or more processors in the computing device to segregate the software development project into one or more modules based on at least one configuration file. The at least one configuration file is deterministic of at least a set of dependencies between the one or more modules. Further, a task corresponding to at least one module from the one or more modules is created. The task is crowdsourced to one or more crowdworkers. Thereafter, a source code of the at least one module, received as a response for the task, is integrated with one or more source codes of remaining of the one or more modules to generate an integrated software package based on said at least one configuration file. Further, the integrated software package is validated by performing integration testing of the integrated software package.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIGS. 4A and 4B illustrate examples of a project architecture and a configuration file of a software development project respectively, in accordance with at least one embodiment;

DETAILED DESCRIPTION

Figure 1:
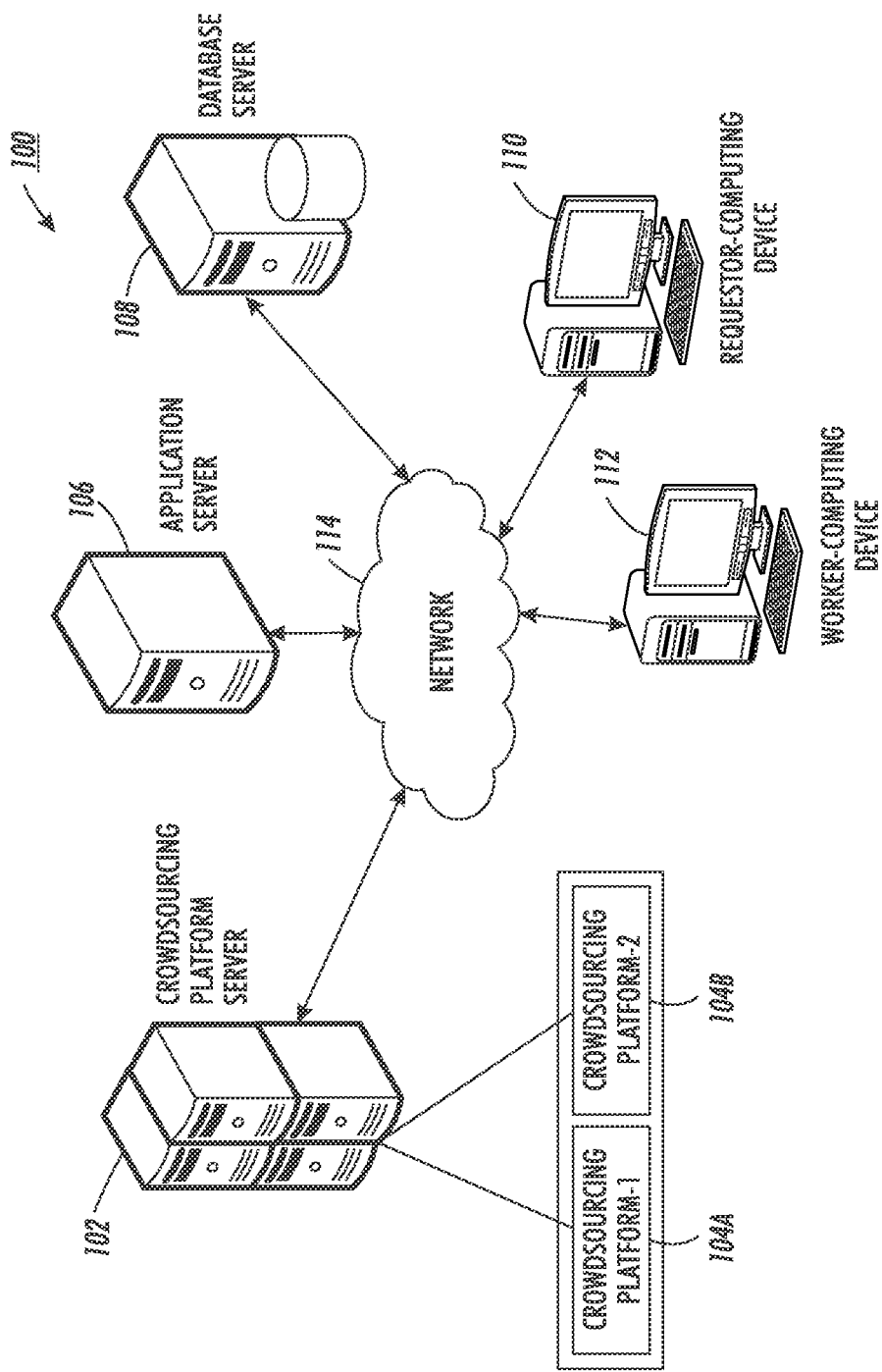
FIG. 1 is a block diagram of a system environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the meanings set forth below.

A "task" refers to a piece of work, an activity, an action, a job, an instruction, or an assignment to be performed. Tasks may necessitate the involvement of one or more workers. Examples of the tasks may include, but are not limited to, digitizing a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk and Crowd Flower.

A "crowdsourcing platform" refers to a business application, wherein a broad, loosely defined external group of people, communities, or organizations provide solutions as outputs for any specific business processes received by the application as inputs. In an embodiment, the business application may be hosted online on a web portal (e.g., crowdsourcing platform servers). Examples of the crowdsourcing platforms include, but are not limited to, Amazon Mechanical Turk or Crowd Flower.

A "crowdworker" refers to a workforce/worker(s) who may perform one or more tasks that generate data that contributes to a defined result. According to the present disclosure, the crowdworker(s) includes, but is not limited to, a satellite center employee, a rural business process outsourcing (BPO) firm employee, a home-based employee, or an internet-based employee. Hereinafter, the terms "crowdworker," "worker," "remote worker," "crowdsourced workforce," and "crowd" may be used interchangeably.

"Remuneration" refers to rewards received by the one or more crowdworkers for attempting/submitting the one or more tasks. In an embodiment, the remuneration is a monetary compensation received by the one or more crowdworkers. However, a person having ordinary skill in the art would understand that the scope of the disclosure is not limited to remunerating the one or more crowdworkers with monetary compensation. In an embodiment, various other means of remunerating the one or more crowdworkers may be employed such as, remunerating the owners with lottery tickets, giving gift items, shopping vouchers, and discount coupons. In another embodiment, the remuneration may further correspond to strengthening of the relationship between the one or more crowdworkers and the crowdsourcing platform. For example, the crowdsourcing platform may provide the crowdworker with an access to more tasks so that the crowdworker may gain more. In addition, the crowdsourcing platform may improve the reputation score of the crowdworker so that more tasks are assigned to the crowdworker. A person skilled in the art would understand that combination of any of the aforementioned means of remuneration could be used for remunerating the one or more crowdworkers.

A "performance score" refers to a score assigned to a crowdworker based on his/her performance of various tasks through the crowdsourcing platform. In an embodiment, the performance score may be determined as a ratio of correctly attempted tasks to the total number of tasks attempted by the crowdworker. In addition, the performance score may also be determined based on other factors such as, but not limited to, the worker's accuracy in performing the tasks, his/her turnaround time on each task, availability for performing the tasks posted on the crowdsourcing platform, and so on.

A "reputation score" refers to a score assigned to a crowdworker based on his/her interactions with the crowdsourcing platform. In an embodiment, the reputation score may correspond to level associated with the crowdworker based on his/her historical performance trend. For example, a crowdworker who is consistent in his/her performance scores (e.g., a crowdworker with performance scores greater than 70% on more than 90% occasions) may be assigned a high reputation score. Further, in an embodiment, such a crowdworker may be provided with a higher remuneration than other workers with a lower reputation score.

"Software development" refers to computer programming/coding, documenting, testing, bug fixing, and all other activities related to creation and maintenance of a software application through the various stages of the software's lifecycle.

"Module" refers to a logical portion of a software application that is being developed or that has been developed. In an embodiment, a software development project may be segregated into one or more modules for development. In an embodiment, a module may correspond to a class/interface in an object oriented programming paradigm that models a functionality or property of a real-world entity.

A "configuration file" refers to a file that specifies a set of inter-dependencies between various modules of a software application. In an embodiment, the configuration file may be utilized to inject dependencies between various modules of the software application. For example, the configuration file may correspond an XML file when the software application is developed using a Java or a .NET based software development platform.

A "project architecture" refers to a diagram illustrating a relationship between various entities of software project such as classes, interfaces, member functions, and instances of properties/variables/objects. Examples of the project architecture include, but are not limited to, an Entity Relationship (ER) Diagram, a Class/Interface Diagram, a Unified Modeling Language (UML) Diagram, and so forth.

"Segregation" refers to a process of breaking-up or splitting a software development project into one or more parts or modules on the basis of a criteria such as a property or functionality of each part/module.

"Validation/validation of software" refers to a process of checking whether software meets a set of guidelines or specifications set for the development or testing of the software. In an embodiment, the validation of the software corresponds to testing the software against a set of test cases by utilizing one or more software testing techniques known in the art.

"Unit testing" refers to a process of testing individual modules of a software project to determine whether the individual modules perform an expected functionality by returning expected outputs on given inputs. One or more white box testing techniques known in the art may be utilized to perform unit testing of an individual module.

"Integrating software" refers to a process of compiling individual modules of a software project, linking the individual modules and hence building the linked individual modules into an integrated software package.

"Integration testing" refers to process of testing an integrated software package in its entirety. Thus, integration testing is the testing of the software package integrated from the individual modules. One or more black box testing techniques known in the art may be utilized to perform the integration testing on the integrated software package.

"Assembling of code" refers to process of conversion of compiled/object code into a machine level/executable code.

FIG. 1 is a block diagram of a system environment 100, in which various embodiments can be implemented. The system environment 100 includes a crowdsourcing platform server 102, an application server 106, a database server 108, a requestor-computing device 110, a worker-computing device 112, and a network 114.

In an embodiment, the crowdsourcing platform server 102 is configured to host one or more crowdsourcing platforms (for e.g., a crowdsourcing platform-1 104a and a crowdsourcing platform-2 104b). One or more workers are registered with the one or more crowdsourcing platforms. Further, the crowdsourcing platform (such as the crowdsourcing platform-1 104a or the crowdsourcing platform-2 104b) may crowdsource one or more tasks by offering the one or more tasks to the one or more workers. In an embodiment, the crowdsourcing platform (e.g., 104a) presents a user interface to the one or more workers through a web-based interface or a client application. The one or more workers may access the one or more tasks through the web-based interface or the client application. Further, the one or more workers may submit a response to the crowdsourcing platform (i.e., 104a) through the user interface.

A person skilled in the art would understand that though FIG. 1 illustrates the crowdsourcing platform server 102 as hosting only two crowdsourcing platforms (i.e., the crowdsourcing platform-1 104a and the crowdsourcing platform-2 104b), the crowdsourcing platform server 102 may host more than two crowdsourcing platforms without departing from the spirit of the disclosure. Alternatively, the crowdsourcing platform server 102 may host a single crowdsourcing platform.

In an embodiment, the crowdsourcing platform server 102 may be realized through an application server such as, but not limited to, a Java application server, a .NET framework, and a Base4 application server.

In an embodiment, the application server 106 is configured to receive a request for crowdsourcing of a software development project from a requestor. In an embodiment, the request may include at least one configuration file and a project architecture associated with the software development project. Based on the at least one configuration file and the project architecture, the application server 106 may segregate the software development project into one or more modules. In an embodiment, the at least one configuration file may be deterministic of at least a set of dependencies between the one or more modules. Thereafter, in an embodiment, the application server 106 may receive an input from the requestor that pertains to a selection of at least one module from the one or more modules for crowdsourcing. The application server 106 may create a task corresponding to the at least one module from the one or more modules for crowdsourcing to one or more crowdworkers. In an embodiment, the application server 106 may upload the task, so created, on the crowdsourcing platform, e.g., 104a. The crowdsourcing platform 104a may in-turn crowdsource the task to the one or more crowdworkers. In an embodiment, the selection of the one or more crowdworkers for crowdsourcing the task may depend on one or more task distribution parameters, which may also be received from the requestor along with the request. Examples of the one or more task distribution parameters may include, but are not limited to, a budget associated with the software development project, a complexity associated with the task, and a performance/reputation score associated with the crowdworkers.

Further, the application server 106 may receive a response for the task from the one or more crowdworkers via the crowdsourcing platform, i.e., 104a. In an embodiment, the response may include a source code for the at least one module. The application server 106 may test the source code for the at least one module for errors. Further, the application server 106 may assign a confidence score to the source code of the at least one module based on the testing of the at least one module and a performance/reputation score associated with the one or more crowdworkers. The application server 106 may create a second task corresponding to the at least one module when the confidence score is less than a predetermined threshold. If the source code of the at least one module is determined as error free (or valid) based on the testing, the application server 106 may integrate the source code of the at least one module with one or more source codes of remaining of the one or more modules to generate an integrated software package. In an embodiment, the application server 106 may receive the one or more source codes of the remaining of the one or more modules from the requestor. Alternatively, when each of the one or more modules are selected for crowdsourcing by the requestor, the source code of each of the one or more modules may be received as responses from the one or more crowdworkers. Thereafter, the application server 106 may validate the integrated software package by performing integration testing of the integrated software package. In an embodiment, the second task may also be created when one or more errors are detected during the integration testing of the integrated software package. When the integrated software package is determined as error free (or valid) based on the integration testing, the application server 106 may assemble the integrated software package. An embodiment of crowdsourcing of the software development project is further explained in conjunction with FIG. 3. Further, examples of user-interfaces presented to the requestor for have been illustrated in FIGS. 5A, 5B, and 7. Examples of user-interfaces presented to the crowdworker have been illustrated in FIGS. 6 and 8.

Some examples of the application server 106 may include, but are not limited to, a Java application server, a .NET framework, and a Base4 application server.

A person with ordinary skill in the art would understand that the scope of the disclosure is not limited to illustrating the application server 106 as a separate entity. In an embodiment, the functionality of the application server 106 may be implementable on/integrated with the crowdsourcing platform server 102.

In an embodiment, the database server 108 is configured to store the at least one configuration file, the project architecture, information pertaining to the one or more modules, the task, and the one or more source codes for the remaining of the one or more modules. In an embodiment, the database server 108 may receive a query from the crowdsourcing platform server 102 and/or the application server 106 to extract at least one of the at least one configuration file, the project architecture, information pertaining to the one or more modules, the task, and/or the one or more source codes for the remaining of the one or more modules from the database server 108. The database server 108 may be realized through various technologies such as, but not limited to, Microsoft® SQL server, Oracle, and My SQL. In an embodiment, the crowdsourcing platform server 102 and/or the application server 106 may connect to the database server 108 using one or more protocols such as, but not limited to, Open Database Connectivity (ODBC) protocol and Java Database Connectivity (JDBC) protocol.

A person with ordinary skill in the art would understand that the scope of the disclosure is not limited to the database server 108 as a separate entity. In an embodiment, the functionalities of the database server 108 can be integrated into the crowdsourcing platform server 102 and/or the application server 106.

The requestor-computing device 110 is a computing device used by a requestor to send the request for crowdsourcing of the software development project to the application server 106. In an embodiment, the requestor may upload the at least one configuration file and the project architecture of the software development project to the application server 106. Further, based on the segregation of the software development project into the one or more modules, the requestor may select the at least one module for crowdsourcing and may upload the one or more source codes for the remaining of the one or more modules to the application server 106. Alternatively, the requestor may select each of the one or more modules for crowdsourcing and may not provide any source code. Further, the requestor may provide the one or more task distribution parameters through the requestor-computing device 110. Examples of the requestor-computing device 110 include, but are not limited to, a personal computer, a laptop, a personal digital assistant (PDA), a mobile device, a tablet, or any other computing device.

The worker-computing device 112 is a computing device used by a crowdworker. The worker-computing device 112 is configured to present the user interface (received from the crowdsourcing platform, e.g., 104*a*) to the crowdworker. The crowdworker receives the task from the crowdsourcing platform (i.e., 104*a*) through the user interface. Thereafter, the crowdworker submits the response for the task through the user interface to the crowdsourcing platform (i.e., 104*a*). Examples of the worker-computing device 112 include, but are not limited to, a personal computer, a laptop, a personal digital assistant (PDA), a mobile device, a tablet, or any other computing device.

The network 114 corresponds to a medium through which content and messages flow between various devices of the system environment 100 (e.g., the crowdsourcing platform server 102, the application server 106, the database server 108, the requestor-computing device 110, and the worker-computing device 112). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

Figure 2:
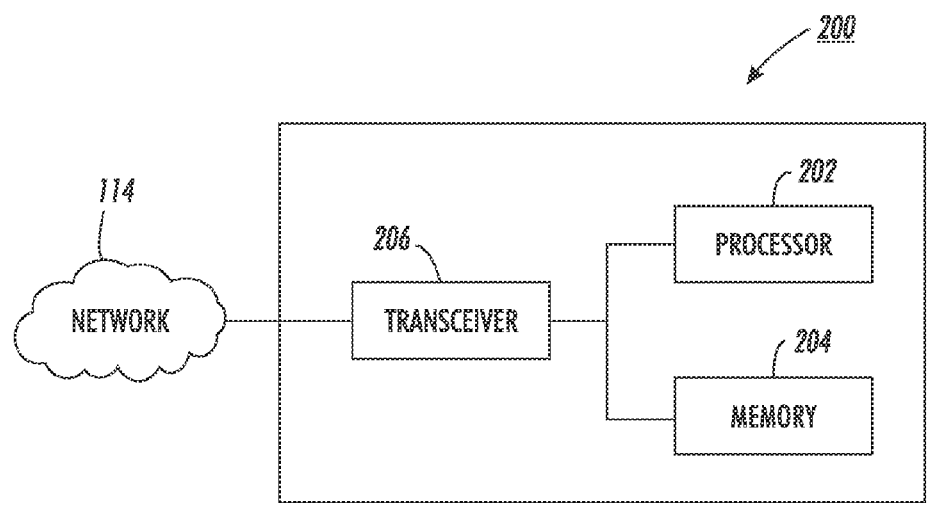
FIG. 2 is a block diagram that illustrates a system for crowdsourcing a software development project, in accordance with at least one embodiment.

FIG. 2 is a block diagram that illustrates a system 200 for crowdsourcing the software development project, in accordance with at least one embodiment. In an embodiment, the system 200 may correspond to the crowdsourcing platform server 102, the application server 106, or the requestor-computing device 110. For the purpose of ongoing description, the system 200 is considered as the application server 106. However, the scope of the disclosure should not be limited to the system 200 as the application server 106. In an embodiment, the system 200 can also be realized as the crowdsourcing platform server 102 or the requestor-computing device 110 without departing from the spirit of the disclosure.

The system 200 includes a processor 202, a memory 204, and a transceiver 206. The processor 202 is coupled to the memory 204 and the transceiver 206. The transceiver 206 is connected to the network 114.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skill in the art that the one or more instructions stored in the memory 204 enable the hardware of the system 200 to perform the predetermined operations.

The transceiver 206 transmits and receives messages and data to/from various components of the system environment 100 (e.g., the crowdsourcing platform server 102, the database server 108, the requestor-computing device 110, and the worker-computing device 112) over the network 114. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as, TCP/IP, UDP, and 2G, 3G, or 4G communication protocols.

Figure 3:
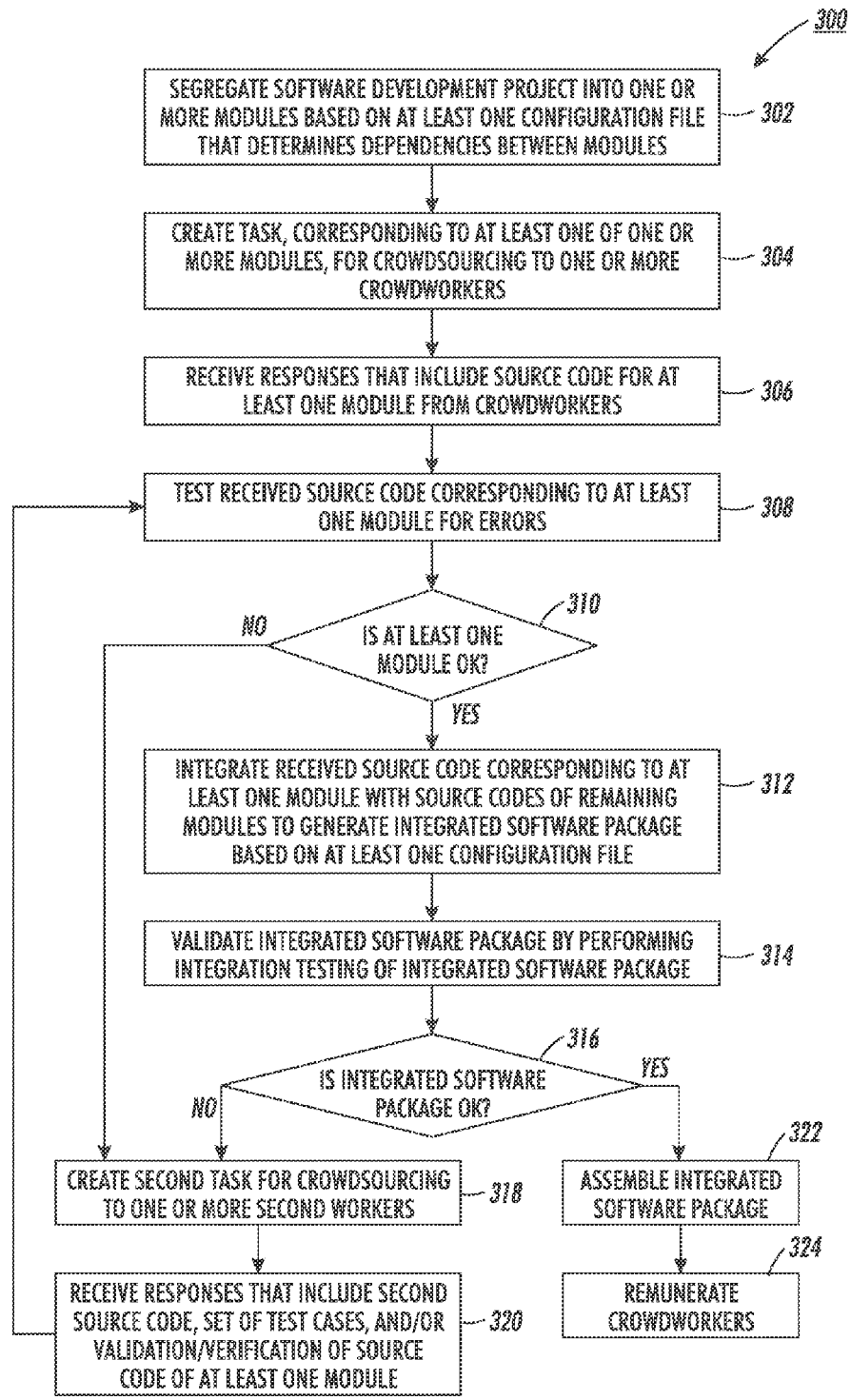
FIG. 3 is a flowchart that illustrates a method for crowdsourcing a software development project, in accordance with at least one embodiment.

The operation of the system 200 for crowdsourcing the software development project has been described in conjunction with FIG. 3.

FIG. 3 is a flowchart 300 illustrating a method for crowdsourcing the software development project, in accordance with at least one embodiment. The flowchart 300 is described in conjunction with FIG. 1 and FIG. 2.

At step 302, the software development project is segregated into the one or more modules based on the at least one configuration file. In an embodiment, the processor 202 is configured to segregate the software development project into the one or more modules. In an embodiment, the processor 202 receives the request from the requestor for crowdsourcing of the software development project. As discussed above, the requestor may provide the at least one configuration file and the project architecture associated with the software development project along with the request. For example, the at least one configuration file may correspond an XML file when the software project is to developed using a Java or a .NET based software development platform. In an embodiment, the project architecture may correspond to an entity relationship model associated with the software development project. The project architecture may be deterministic of various classes and interfaces to be developed as a part of the software along with the relationship between the classes and interfaces. For example, the project architecture may include a UML diagram enumerating one or more classes, one or more member functions of the one or more classes, one or more interfaces, and one or more relationships between the one or more classes and/or the one or more interfaces. The UML diagram may also include comments describing a purpose of the one or more classes, the one or more member functions, the one or more interfaces, and the one or more relationships. In an embodiment, the at least one configuration file may be deterministic of at least a set of dependencies between the one or more modules. For example, the at least one configuration file may correspond to an XML file that specifies which classes require/invoke dependent objects and which classes may supply the dependent objects. In an embodiment, the processor 202 may utilize Inversion of Control (IoC) framework such as a dependency injection pattern to segregate the software development project into the one or more modules based on the at least one configuration file and the project architecture. Examples of the dependency injection pattern include, but are not limited to, Spring™ Framework, Google Guice™ Framework, and Ninject™ Framework.

Figure 4A:
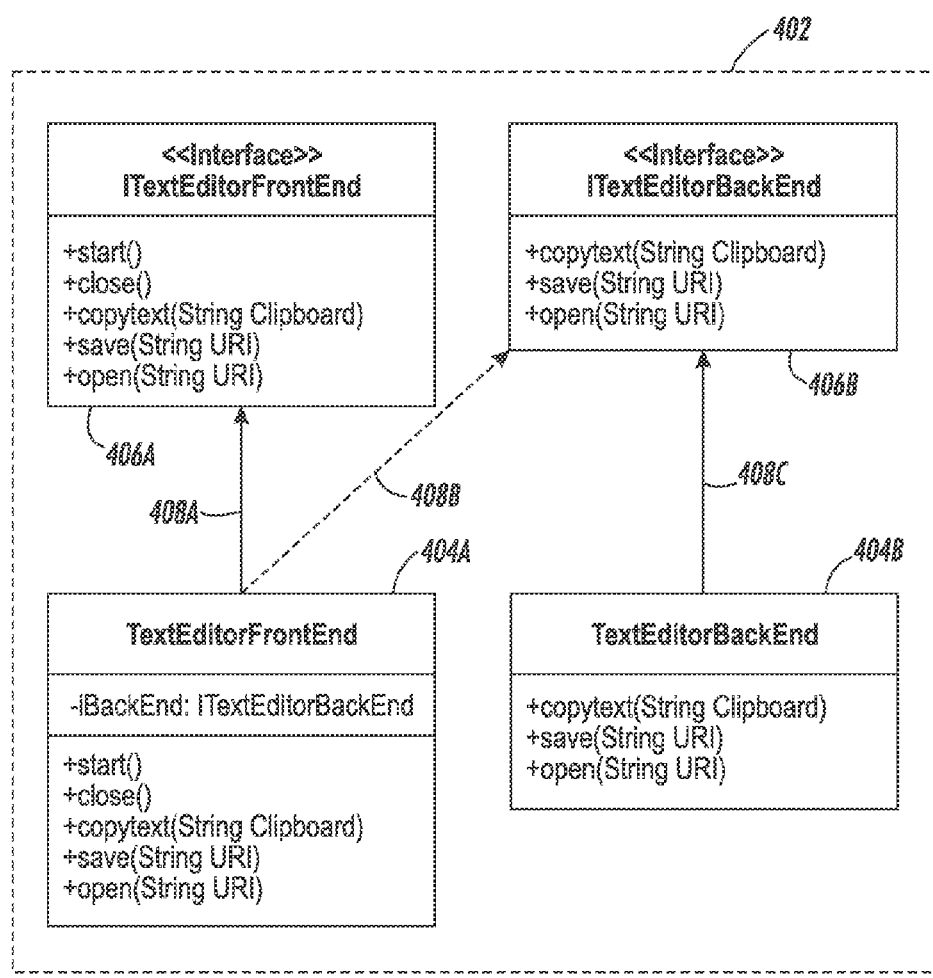

For example, the software to be developed corresponds to a GUI-based text editor. FIG. 4A illustrates an example of a UML diagram (a project architecture) of the GUI-based text editor. FIG. 4B illustrates an example of an XML file (a configuration file) using Spring™ Framework to inject dependencies among classes of the software project (i.e., the GUI-based text editor). Based on the UML diagram and XML file of the project, the processor 202 may segregate the project (i.e., GUI-based text editor) into two modules: a Module M1 (for development of class TextEditorFrontEnd, denoted by 404a) and a Module M2 (for development of class TextEditorBackEnd, denoted by 404b).

After the segregation of software development project into the one or more modules, in an embodiment, the processor 202 may present an option to the requestor with regard to which of the one or more modules are to be crowdsourced. The requestor may select the at least one module from the one or more modules for crowdsourcing.

At step 304, the task corresponding to the at least one module is created for crowdsourcing to the one or more crowdworkers. In an embodiment, the processor 202 is configured to create the task corresponding to the at least one module. In an embodiment, the task may correspond to a development of a functionality of the at least one module through coding of at least one class, at least one member function, at least one interface, and one or more relationships between the at least one class and the at least one interface, associated with the at least one module.

After creating the task, in an embodiment, the processor 202 may present a preview of the task (for developing the software module) to the requestor. The requestor may provide the one or more task distribution parameters when presented with the preview of the task. In an embodiment, the one or more task distribution parameters may include, but are not limited to, a budget associated with the software development project, a complexity associated with the task, and a performance/reputation score associated with the crowdworkers. In an embodiment, the processor 202 may submit the task on the crowdsourcing platform, e.g., 104a. The crowdsourcing platform (i.e., 104a) may select the one or more crowdworkers for performing the task based on the one or more task distribution parameters.

For example, the complexity assigned to the task may be one of a high complexity, a medium complexity, or a low complexity. If the task is of high complexity, the task may be assigned to crowdworkers with a performance/reputation score of 0.80 (80%) or more. However, if the task is of medium complexity or of low complexity, the task may be assigned to crowdworkers having performance/reputation scores in the ranges of 0.70 to 0.80 and 0.60 to 0.70 respectively. The budget associated with the software development project may restrict the number of crowdworkers to be assigned the same module and the amount of remuneration offered to each such crowdworker. In an embodiment, the budget allocated to each of the at least one module may depend on the complexity of the module. For example, the at least one module includes modules M1, M2, and M3 having high, medium, and low complexities, respectively. If the overall budget associated with the software development project is USD X, the budgets assigned to the modules M1, M2, and M3 may be X/2, X/3, and X/6 respectively. Thus, in this case, the budget is divided in a ratio of 3:2:1 among the modules of high, medium, and low complexities. However, the budget may be divided in any ratio without departing from the scope of the disclosure. Further, the remunerations that may be offered to crowdworkers for the modules M1, M2, and M3 may be in the ratio of 3:2:1, if the same number of crowdworkers are assigned to each of the modules M1, M2, and M3. A person skilled in the art would appreciate that any remuneration scheme may be utilized to determine the remuneration receivable by the one or more crowdworkers for performing the task.

At step 306, the response that includes the source code for the at least one module is received from the one or more crowdworkers. In an embodiment, the processor 202 is configured to receive the response from the one or more crowdworkers via the crowdsourcing platform, e.g., 104a. The response may include the source code for the at least one module. The response may also include a set of test cases for the at least one module. In an embodiment, the set of test cases corresponds to a set of input values for which the functionality of the module has been tested. In an embodiment, the set of test cases included in the response corresponds to test cases used by the crowdworker (who worked in the development of the module) to test the module.

At step 308, the received source code for the at least one module is tested for errors. In an embodiment, the processor 202 is configured to test the received source code corresponding to the at least one module for errors. In an embodiment, the processor 202 may check the source code for one or more issues such as, but not limited to, an incompleteness issue, a syntactical bug, an improper exception handling issue, a race condition, a logical/flow related bug, an improper memory handling issue, or a boundary/constraint related bug. In an embodiment, the source code is checked for errors against a set of test cases for the at least one module, which may be provided by the requestor, received from the one or more crowdworkers, or generated by the processor 202 based on the project architecture. For example, the requestor may provide one or more use cases with a set of input values and expected output values for the at least one module. The processor 202 may compile the source code and generate an executable file for the source code, and run the executable file with the set of input values. If the output obtained on running the executable file coincides with the output values provided by the requestor, the source code for the at least one module may be determined as valid.

In an embodiment, the number and type of tests employed on the received source code for the at least one module may depend on the complexity of the at least one module. For instance, the number of tests performed on the source code received for a high complexity module may be greater and more rigorous than that performed on the source code received for a medium or low complexity module. A person skilled in the art would appreciate that any known unit testing technique may be utilized to test the received source code for the at least one module.

Further, in an embodiment, the processor 202 may assign the confidence score to the at least one module based on a ratio of number of test cases passed to a total number of test cases checked on the source code for the at least one module. For example, if 20 out of a total of 25 test cases pass for a particular module, a confidence score of 80% (or 0.80) may be assigned to the module. In addition, the confidence score assigned to the at least one module may be weighted based on the performance/reputation score of the one or more crowdworkers. For example, source code files SC1, SC2, SC3, . . . , and SCn are received from crowdworkers C1, C2, C3, . . . , and Cn respectively for the at least one module. The performance/reputation scores of the crowdworkers C1, C2, C3, . . . , and Cn are P1, P2, P3, . . . , and Pn, respectively. Further, if the confidence score assigned to the source code files SC1, SC2, SC3, . . . , and SCn based on the testing of the individual source code files is S1, S2, S3, . . . , and Sn, respectively, the weighted confidence score (WS) assigned to the at least one module may be represented by:

$$WS = \frac{S1*P1 + S2*P2 + S3*P3 + \ldots + Sn*Pn}{P1 + P2 + P3 + \ldots + Pn}$$

In another embodiment, the testing of the source code for the at least one module may be crowdsourced to one or more second crowdworkers. In such a scenario, the processor 202 may create a second task that includes the source code and a description of the at least one module. In an embodiment, the one or more second crowdworkers may provide one or more test cases for the at least one module, which may in-turn be utilized for testing of the source code along with the set of test cases provided by the requestor. Alternatively, the one or more second crowdworkers may test the source code for the at least one module by utilizing the worker-computing device 110 to compile the source code into an executable file and thereafter run the executable file against one or more test cases. In such a scenario, each of the one or more second crowdworkers may respond by providing a binary response corresponding to a validity of the source code. For example, the one or more second crowdworkers may reply "Valid" or "Yes" when the source code is valid and may reply "Invalid" or "No" otherwise. In an embodiment, an accuracy of such responses may be determined based on one or more known methods such as majority voting or weighted majority voting (where the weights may be based on the performance/reputation score of the crowdworkers). Further, the number of validations for the at least one module may be set based on the complexity of the module. For instance, a module of High complexity may require validation from at least five crowdworkers, i.e., at least five crowdworkers should provide the same response. However, a module of low complexity may require only two validations, while a module of medium complexity may require at least three validations. The creation of the second task for crowdsourcing to the one or more second crowdworkers is similar to that described in step 318.

At step 310, a check is performed to determine whether the at least one module is valid based on the testing of the source code. In an embodiment, the processor 202 is configured to perform the check. In an embodiment, the check may correspond to a comparison of the confidence score (or weighted confidence score) assigned to the at least one module with the pre-determined threshold. If the confidence score (or weighted confidence score) is greater than or equal to the pre-determined threshold, the module is determined as valid. If the module is determined as valid, step 312 is performed, and otherwise, step 318 is performed.

At step 312, the source code received for the at least one module is integrated with the one or more source codes of remaining of the one or more modules to generate the integrated software package based on said at least one configuration file. In an embodiment, the processor 202 is configured to integrate the source code for the at least one module with the one or more source codes of remaining of the one or more modules based on said at least one configuration file. In an embodiment, the one or more source codes of the remaining of the one or more modules may be provided by the requestor during the preview of the task. In an embodiment, the processor 202 may utilize an Inversion of Control (IoC) framework based on the at least one configuration file to generate the integrated software package from the source code of the at least one module and the one or more source codes of the remaining of the one or more modules. For example, based on the at least one configuration file, the processor 202 may inject dependencies between the one or more modules by utilizing a dependency injection pattern (a type of IoC) such as, but not limited to, Spring™ Framework, Google Guice™ Framework, and Ninject™ Framework.

At step 314, the integrated software package is validated by performing integration testing of the integrated software package. In an embodiment, the processor 202 is configured to perform the integration testing of the integrated software package to validate the integrated software package. One or more integration testing methods known in the art may be utilized to perform the integration testing of the integrated software package.

At step 316, a check is performed to determine whether the integrated software package is valid. In an embodiment, the processor 202 is configured to perform the check. If at step 316, the integrated software package is determined as valid, step 322 is performed, and otherwise, step 318 is performed.

At step 318, the second task is created for crowdsourcing to the one or more second crowdworkers. In an embodiment, the processor 202 is configured to create the second task for crowdsourcing to the one or more second crowdworkers. In an embodiment, the creation of the second task corresponds to the scenario in which either the at least one module or the integrated software package is determined as containing one or more errors. In an embodiment, the requestor may again specify the one or more task distribution parameters that may be utilized for selecting the one or more second crowdworkers for crowdsourcing the second task. In an embodiment, the second task may require the one or more second crowdworkers to provide at least one of a second source code for the at least one module, a second set of test cases for the source code of the at least module, or a validation/verification of the source code of the at least one module (as explained in step 308).

At step 320, responses for the second task are received from the one or more second crowdworkers. In an embodiment, the processor 202 is configured to receive the responses for the second task from the one or more second crowdworkers via the crowdsourcing platform, e.g., 104a. In an embodiment, the responses to the second task may include at least one of the second source code for the at least one module, the second set of test cases for the source code of the at least one module or the validation/verification of the source code of the at least one module. Thereafter, the received second source code of the at least one module are tested for errors (refer step 308). Alternatively, the source code of the at least one module is tested based on the second set of test cases and/or the validation/verification of the source code of the at least one module (refer step 308).

At step 322, the integrated software package is assembled. In an embodiment, the processor 202 is configured to assemble the integrated software package into an executable file. One or more code assembling techniques known in the art may be utilized to assemble the integrated software package into the executable file. In an embodiment, the processor 202 may send the executable file to the requestor along with the source code for each of the one or more modules, in addition to the test cases.

At step 324, the crowdworkers are remunerated. In an embodiment, the processor 202 is configured to facilitate a remuneration of crowdworkers who contributed in the development/testing of the code of the software development project. In an embodiment, the processor 202 determines crowdworkers who provided valid responses. For example, the processor 202 determines the crowdworkers who provided valid source codes, test cases, and/or correct validation/verification of source codes. Such crowdworkers may then be remunerated based on their respective performance/reputation scores and a pre-determined rate associated with each type of response. For instance, crowdworkers who provide valid source codes may be provided a remuneration of USD 5, while those providing valid test cases may be provided a remuneration of USD 2. Further, the remuneration receivable by a crowdworker with a performance/reputation score of 0.8 may be twice the remuneration receivable by another crowdworker having a performance/reputation score of 0.4. Various other remuneration schemes may be suitably used without departing from the scope of the disclosure. In an embodiment, the processor 202 may instruct the crowdsourcing platform, e.g., 104a to credit appropriate remuneration amounts to the crowdworkers and debit an aggregate of the credited remuneration amounts to the requestor. In an embodiment, the crowdsourcing platform, e.g., 104a may also debit an additional fees to the requestor's account for processing of the crowdsourcing of the tasks.

FIGS. 4A and 4B illustrate examples of the project architecture and the configuration file of the software development project respectively, in accordance with at least one embodiment.

Referring to FIG. 4A, the project architecture corresponds to a UML diagram 402 for the development of a GUI-based text editor, a sample software development project. The UML diagram 402 for the GUI-based text editor contains two classes: TextEditorFrontEnd (depicted by 404a) and TextEditorBackEnd (depicted by 404b) and two interfaces: ITextEditorFrontEnd (depicted by 406a) and ITextEditorBackEnd (depicted by 406b). The class TextEditorFrontEnd 404a includes member functions: start( ): to start the UI of the text editor, close( ): to close the UI of the text editor, copytext( ): to copy a selected text to the system clipboard, save( ): to save an opened text file, and open( ): to open a text file and display its contents within the UI of the text editor. The class TextEditorFrontEnd 404a also includes an instance of the interface ITextEditorBackEnd 406b with the name "iBackEnd". The class TextEditorBackEnd 404b includes member functions: copytext( ), save( ), and open( ). As shown in FIG. 4A, the interface ITextEditorFrontEnd 406a implements the functions start( ), close( ), copytext( ), save( ), and open( ). Further, the interface ITextEditorBackEnd 406b implements the functions copytext( ), save( ), and open( ).

Further, as shown in FIG. 4A, the class TextEditorFrontEnd (depicted by 404a) depends on interfaces: ITextEditorFrontEnd (depicted by 406a) and ITextEditorBackEnd (depicted by 406b), where lines 408a and 408b illustrate dependence of the class TextEditorFrontEnd 404a on the respective interfaces (406a and 406b). Further, the class TextEditorBackEnd 404b depends on the interface ITextEditorBackEnd 406b, which is depicted by line 408c. An example of a configuration file for the GUI-based text editor is illustrated in FIG. 4B.

Referring to FIG. 4B, the configuration file corresponds to an XML file 410 using Spring™ framework to inject dependencies among classes of the GUI-based text editor. As shown in FIG. 4B, within the XML file 410, the class "TextEditorFrontEnd" (depicted by 404a in FIG. 4A) has been defined within a bean tag having an id "frontend", while the class "TextEditorBackEnd" (depicted by 404b in FIG. 4A) has been defined inside another bean tag with an id "backend". The dependency of the class "TextEditorFrontEnd" (depicted by 404a in FIG. 4A) on the class "TextEditorBackEnd" (depicted by 404b in FIG. 4A) has been injected through a property named "iBackEnd" within the bean tag "frontend" referring the bean tag "backend".

Figure 5A:
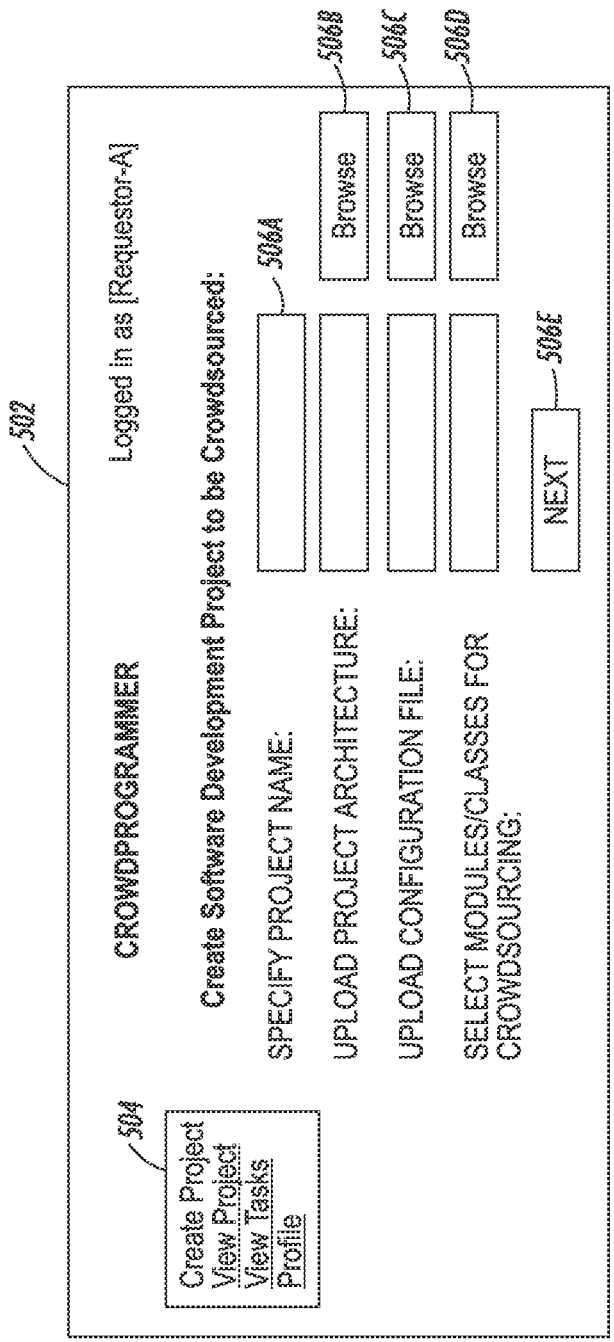
FIGS. 5A and 5B illustrate example user-interfaces that may be presented to a requestor on the requestor's computing device for crowdsourcing of a software development project, in accordance with at least one embodiment.
Figure 5B:
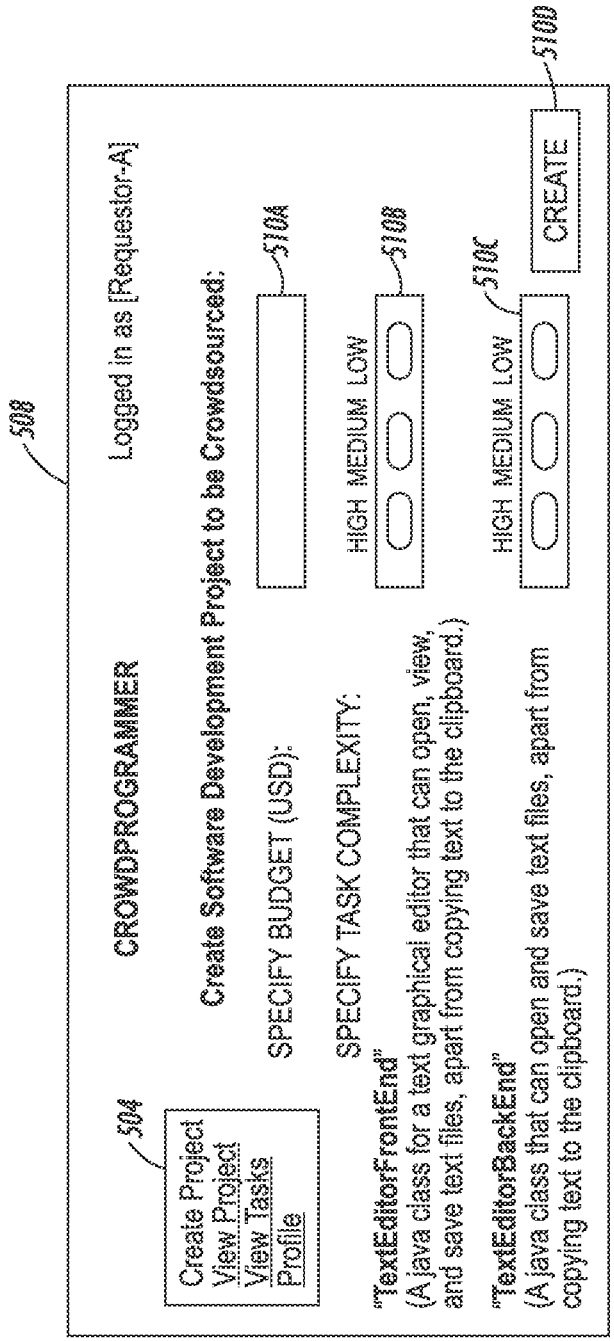

FIGS. 5A and 5B illustrate example user-interfaces that may be presented to the requestor on the requestor-computing device 110 for crowdsourcing of the software development project, in accordance with at least one embodiment.

Referring to FIG. 5A, a requestor (e.g., requestor-A) may be displayed a user-interface (depicted by 502) with various options such as "create project", "view project", "view tasks", and "profile". The option menu has been depicted by 504. When the requestor-A selects the option "create project", he/she may be prompted to enter various information related to the software development project to be crowdsourced. For example, as shown in FIG. 5A, the requestor-A may be prompted to enter a project name (within text box denoted by 506a), upload a project architecture (through the file selection menu denoted by 506b), upload a configuration file (through the file selection menu denoted by 506c), and select one or more classes/modules for crowdsourcing (through the file selection menu denoted by 506d). On providing the required information and pressing "next" button (depicted by 506e), the requestor-A may be presented with user-interface of FIG. 5B (depicted by 508).

Referring to FIG. 5B, the user interface (depicted by 508) may be presented to the requestor (e.g., the requestor-A) to receive the one or more task distribution parameters. For example, the requestor-A may be prompted to specify a budget (in USD) for the crowdsourcing of the software development project (through text box denoted by 510a). Considering the software development project to be the GUI-based text editor (refer FIGS. 4A and 4B), the classes "TextEditorFrontEnd" and "TextEditorBackEnd" along with a description of their functionalities may be displayed within the user-interface 508. In addition, the requestor-A may be prompted to specify a complexity for each class. The complexity for each class may be one of a low, a medium, or a high complexity. The requestor-A may select the complexity of the classes (i.e., the classes "TextEditorFrontEnd" and "TextEditorBackEnd") through the selection boxes depicted by 510b and 510c respectively. In an embodiment, a separate task may be created for crowdsourcing of each class when the requestor-A presses "create" button (depicted by 510d).

A person skilled in the art would appreciate that although not shown, through the user-interface 508, various other inputs may be received from the requestor such as, but not limited to, performance/reputation score of the crowdworkers, the one or more source codes of the modules/classes that are not to be crowdsourced, or one or more test cases for the software project/the selected modules/classes. Further, a person skilled in the art would appreciate that the scope of the disclosure is not limited to the user-interface 508 for creating software development tasks for crowdsourcing. In an embodiment, one or more software testing tasks may also be similarly created for crowdsourcing through user-interfaces similar to the user-interfaces 502 and 508.

Figure 6:
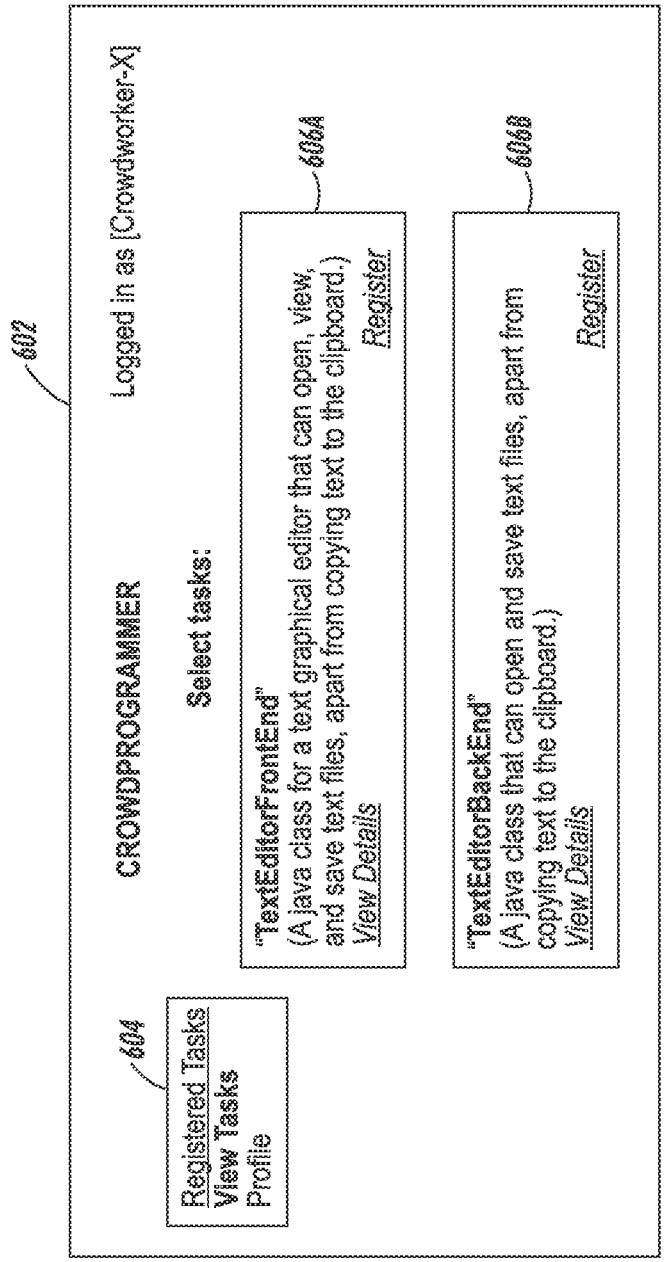
FIG. 6 illustrates an example user-interface that may be presented to a crowdworker on the crowdworker's computing device for displaying crowdsourced tasks, in accordance with at least one embodiment.

FIG. 6 illustrates an example user-interface 602 that may be presented to the crowdworker on the worker-computing device 110 for displaying the crowdsourced tasks, in accordance with at least one embodiment.

As shown in FIG. 6, the user-interface 602 presented to the crowdworker (e.g., a crowdworker-X) includes a region 604 that displays various options to the crowdworker-X such as "registered tasks" (for viewing/performing tasks that the crowdworker has selected to perform), "view tasks" (for viewing tasks that are available on the crowdsourcing platform, e.g., 104*a* for the crowdworker to perform), and "profile" (for viewing and/or editing profile of the crowdworker on the crowdsourcing platform, e.g., 104*a*). When the crowdworker-X selects the "view tasks" option (as in the current case of the user-interface 602), the crowdworker-X may be displayed the crowdsourced tasks that are available on the crowdsourcing platform, e.g., 104*a*. As already discussed, the selection of the one or more crowdworkers for the crowdsourcing task may be based on the one or more task distribution parameters specified by the requestor. In an embodiment, the crowdsourcing tasks presented to the crowdworker may only include those crowdsourcing task for which the crowdworker is qualified based on the one or more task distribution parameters. For instance, if a crowdworker-X has a performance/reputation score of 0.70 (or 70%), the crowdworker-X may be presented with those crowdsourced tasks that require a performance/reputation score of 0.70 or (or 70%).

The crowdworker-X may choose to view details associated with the crowdsourced tasks and then perform one or more of such tasks based on his/her preference. For example, the tasks displayed to the crowdworker-X may include tasks for developing a source code for the two classes "TextEditorFrontEnd" and TextEditorBackEnd". A description associated with functionalities required from each of the two classes, i.e., "TextEditorFrontEnd" and TextEditorBackEnd" is displayed within regions 606*a* and 606*b*, respectively. The crowdworker-X may choose to view further details about these tasks (by selecting "view details" hyperlink) and select one or both of these tasks for performance (by selecting "register" hyperlink).

Figure 7:
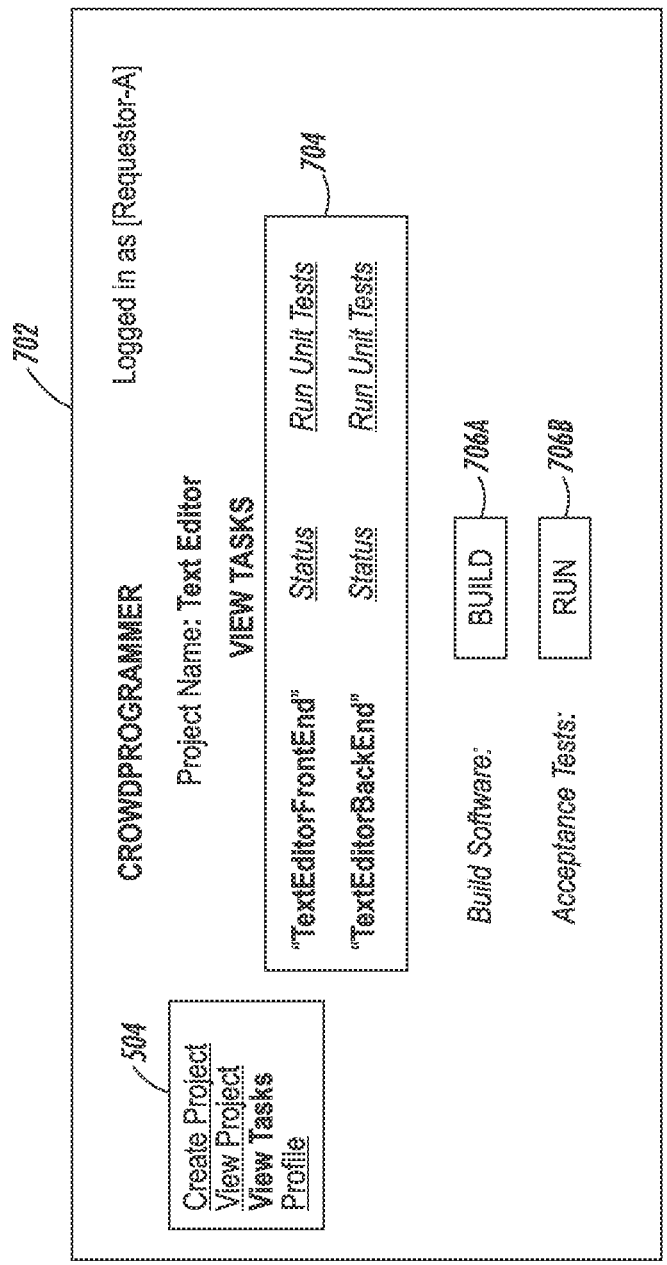
FIG. 7 illustrates an example user-interface that may be presented to a requestor on the requestor's computing device for assessing a progress of a software development project, in accordance with at least one embodiment.

FIG. 7 illustrates an example user-interface 702 that may be presented to the requestor on the requestor-computing device 110 for assessing a progress of the software development project, in accordance with at least one embodiment.

As shown in FIG. 7, the requestor-A selects the option "view tasks" from the option menu 504 to view the user-interface 702 for assessing a progress of the software development project. When the requestor-A so selects, the requestor-A may be presented (within a region 704 of the user-interface 702) a list of crowdsourced tasks (corresponding to the class/modules) and options to view their respective status and run unit tests on the source code received as responses for the respective tasks. For instance, as shown in FIG. 7, the list of crowdsourced tasks include two tasks corresponding to the development of source code for the classes "TextEditorFrontEnd" and "TextEditorBackEnd". The requestor may view status of the individual classes and run unit tests on source code received for the classes by selecting the appropriate hyperlinks within the region 704. In addition, as shown in FIG. 7, the requestor-A may build the software into the integrated software package by pressing the "build" button (depicted by 706*a*). Further, the requestor-A may run acceptance tests (including integration tests) on the integrated software package by pressing the "run" button (depicted by 706*b*).

Figure 8:
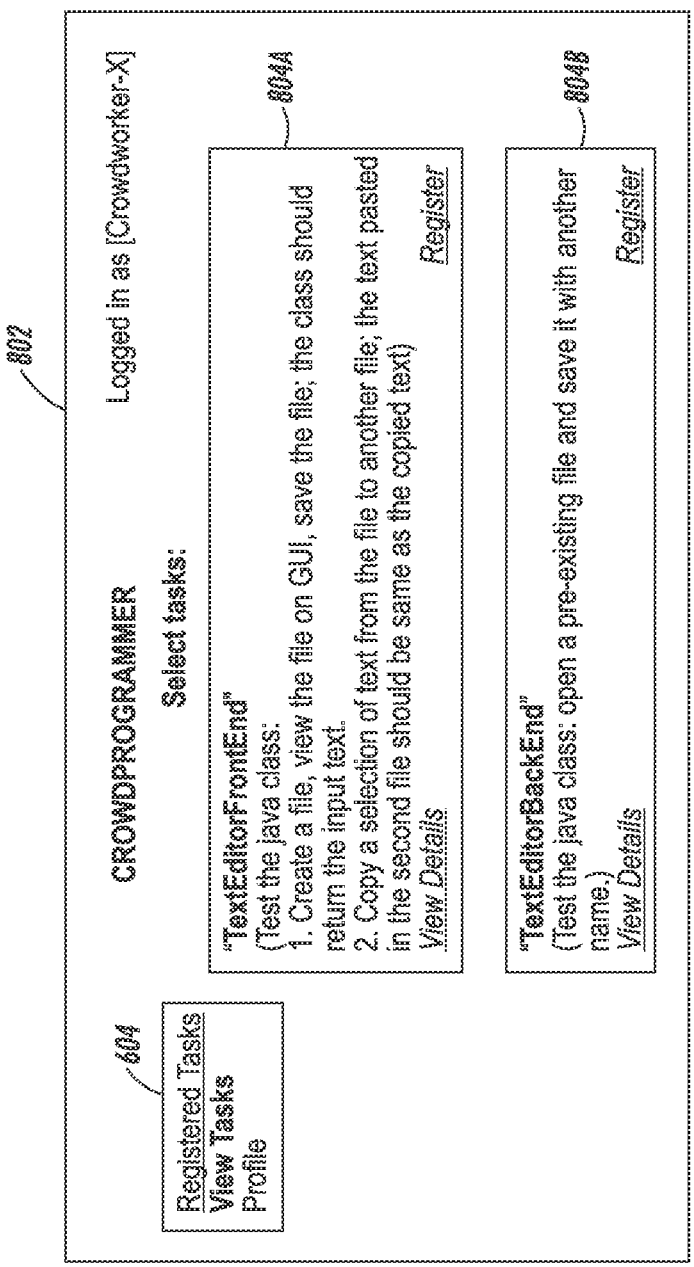
FIG. 8 illustrates an example of another user-interface that may be presented to a crowdworker on the crowdworker's computing device for displaying crowdsourced tasks, in accordance with at least one embodiment.

FIG. 8 illustrates an example of another user-interface 802 that may be presented to the crowdworker on the worker-computing device 110 for displaying the crowdsourced tasks, in accordance with at least one embodiment.

As shown in FIG. 8, through the user-interface 802, the crowdworker (e.g., the crowdworker-X) may be presented with the crowdsourced tasks that are available for the crowdworker-X to attempt. For example, the crowdworker-X is presented with two tasks of testing the source code of the classes "TextEditorFrontEnd" and "TextEditorBackEnd" (within regions 804*a* and 804*b*, respectively, of the user-interface 802). The source code of the two classes may have been developed by one or more other crowdworkers. The regions 804*a* and 804*b* also include a description of the tasks by spelling out the various inputs and outputs required to test the respective classes and the methodology to be followed for performing the testing. A person skilled in the art would appreciate that the tasks for testing the source code of the classes may also require the crowdworker to provide additional test cases for the respective classes. The crowdworker-X may choose to view further details about these tasks (by selecting the "view details" hyperlink) and select one or both of these tasks for performance (by selecting the "register" hyperlink). The user-interface 802 (illustrated in FIG. 8) is similar to the user-interface 602 apart from the tasks that are presented to the crowdworker.

The disclosed embodiments encompass numerous advantages. The disclosure provides for crowdsourced development of a software project. The software project is segregated into one or more modules based on a configuration file that specifies dependencies among the one or more modules and a project architecture of the software project. An inversion of control framework may be used to inject dependencies between the one or more modules based on the configuration file. By utilizing the inversion of control framework, the one or more modules are decoupled and may be developed independently through crowdsourcing to one or more crowdworkers. When responses including source codes for the one or more modules are received, the received source codes may be tested by running unit tests on a per module level. Thereafter, the one or more modules may be integrated into an integrated software package based on the configuration file and the inversion of control framework. Further, integration testing may be performed on the integrated software package. If the integrated software package is found valid based on the integration testing, the integrated software package may be assembled. However, if errors are found at any stage, for instance during the unit testing stage or the integration testing stage, the one or more modules may be crowdsourced again to a second set of crowdworkers to receive test cases or fresh source code for the one or more modules. Further, unit testing of the one or more modules may also be crowdsourced to the second set of crowdworkers. Thus, the inversion of control framework may be effectively leveraged to provide an end-to-end solution for crowdsourcing software development projects.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic". Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for crowdsourcing a software development project have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for crowdsourcing a software development project, the method comprising:
  segregating, by one or more processors, said software development project into one or more modules based on at least one configuration file, wherein said at least one configuration file is deterministic of at least a set of dependencies between said one or more modules;
  creating, by said one or more processors, a task corresponding to at least one module, selected by a requestor from said one or more modules, wherein said task is crowdsourced to a plurality of crowdworkers based on one or more task distribution parameters provided by said requestor during a preview of said task;
  receiving as a response for said task, from the plurality of crowdworkers, source code for the at least one module and test cases having input values to test the functionality of the module;
  validating, by said one or more processors, the source code using the test cases, wherein the validating further performs the steps of:
    determining a confidence score (S) associated with each respective crowdworker based on at least a count of said test cases passed by said source code and a count of total number of said test cases checked for said source code from the respective crowdworker;
    determining a weighted confidence score (WS) associated with the at least one module using the formula, $$WS = \frac{S1*P1 + S2*P2 + S3*P3 + \ldots + Sn*Pn}{P1 + P2 + P3 + \ldots + Pn}$$

wherein (P) represents a respective crowdworkers reputation; and comparing the weighted confidence score associated with the module with a predetermined threshold, wherein the module is valid if the weighted confidence score is greater than or equal to the predetermined threshold;

integrating, by said one or more processors, said source code of said at least one module with one or more source codes of remaining of said one or more modules to generate an integrated software package based on said at least one configuration file; and validating, by said one or more processors, said integrated software package by performing integration testing of said integrated software package.

2. The method of claim 1 further comprising receiving an input, by said one or more processors, pertaining to a selection of said at least one module by said requestor from said one or more modules for crowdsourcing.

3. The method of claim 1, wherein said segregating of said software development project into said one or more modules is based on a project architecture associated with said software development project.

4. The method of claim 1, wherein said plurality of crowdworkers are selected for said task based on a budget associated with said software development project, a complexity associated with said task, and a reputation/performance score associated with said plurality of crowdworkers.

5. The method of claim 1 further comprising testing, by said one or more processors, said source code of said at least one module for errors, wherein said integrated software package is generated based on said testing of said at least one module.

6. The method of claim 5 further comprising assigning, by said one or more processors, said confidence score to said source code of said at least one module based on said testing of said at least one module and a performance/reputation score associated with said plurality of crowdworkers.

7. The method of claim 6 further comprising creating, by said one or more processors, a second task corresponding to said at least one module when said confidence score is less than the predetermined threshold.

8. The method of claim 7, wherein a response received for said second task comprises at least one of a second source code for said at least one module, a set of test cases for said at least one module, or a validation/verification of said source code of said at least one module.

9. The method of claim 5, wherein said plurality of crowdworkers are remunerated based on said testing of said at least one module.

10. The method of claim 1 further comprising assembling, by said one or more processors, said integrated software package based on said validation of said integrated software package.

11. A system for crowdsourcing a software development project, the system comprising:
one or more processors configured to:
segregate said software development project into one or more modules based on at least one configuration file, wherein said at least one configuration file is deterministic of at least a set of dependencies between said one or more modules;
create a task corresponding to at least one module, selected by a requestor from said one or more modules, wherein said task is crowdsourced to a plurality of crowdworkers based on one or more task distribution parameters provided by said requestor during a preview of said task;
receive, as a response for said task, from the plurality of crowdworkers, source code for the at least one module and test cases having input values to test the functionality of the module;
validate the source code using the test cases, wherein the validating further performs the steps of:
determine a confidence score (S) associated with each respective crowdworker based on at least a count of said test cases passed by said source code and a count of total number of said test cases checked for said source code from the respective crowdworker;
determine a weighted confidence score (WS) associated with the at least one module using the formula, $$WS = \frac{S1*P1 + S2*P2 + S3*P3 + \ldots + Sn*Pn}{P1 + P2 + P3 + \ldots + Pn}$$

wherein (P) represents a respective crowdworkers reputation; and
compare the weighted confidence score associated with the module with a predetermined threshold, wherein the module is valid if the weighted confidence score is greater than or equal to the predetermined threshold;
integrate said source code of said at least one module with one or more source codes of remaining of said one or more modules to generate an integrated software package based on said at least one configuration file; and
validate said integrated software package by performing integration testing of said integrated software package.

12. The system of claim 11, wherein said one or more processors are further configured to test said source code of said at least one module for errors, wherein said integrated software package is generated based on said testing of said at least one module.

13. The system of claim 12, wherein said one or more processors are further configured to assign said confidence score to said source code of said at east one module based on said testing of said at least one module and a performance/reputation score associated with said plurality of crowdworkers.

14. The system of claim 13, wherein said one or more processors are further configured to create a second task corresponding to said at least one module when said confidence score is less than the predetermined threshold.

15. The system of claim 14, wherein a response received for said second task comprises at least one of a second source code for said at least one module, a set of test cases for said at least one module, or a validation/verification of said source code of said at least one module.

16. The system of claim 11, wherein said one or more processors are further configured to assemble said integrated software package based on said validation of said integrated software package.

17. A computer program product for use with a computer, said computer program product comprising a non-transitory computer readable medium, wherein said non-transitory computer readable medium stores a computer program code for crowdsourcing software development project, wherein said computer program code is executable by one or more processors to:
segregate said software development project into one or more modules based on at least one configuration file, wherein said at least one configuration file is deterministic of at least a set of dependencies between said one or more modules;

create a task corresponding to at least one module, selected by a requestor from said one or more modules, wherein said task is crowdsourced to a plurality of crowdworkers based on one or more task distribution parameters provided by said requestor during a preview of said task;

receive as a response for said task, from the plurality of crowdworkers, source code for the at least one module and test cases having input values to test the functionality of the module;

validate the source code using the test cases, wherein the validating further performs the steps of:

determining a confidence score (S) associated with each respective crowdworker based on at least a count of said test cases passed by said source code and a count of total number of said test cases checked for said source code from the respective crowdworker;

determining a weighted confidence score (WS) associated with the at least one module using the formula, $$WS = \frac{S1*P1 + S2*P2 + S3*P3 + \ldots + Sn*Pn}{P1 + P2 + P3 + \ldots + Pn}$$

wherein (P) represents a respective crowdworkers reputation; and comparing the weighted confidence score associated with the module with a predetermined threshold, wherein the module is valid if the weighted confidence score is greater than or equal to the predetermined threshold;

integrate said source code of said at least one module with one or more source codes of remaining of said one or more modules to generate an integrated software package based on said at least one configuration file; and validate said integrated software package by performing integration testing of said integrated software package.

18. The computer program product of claim 17, wherein said computer program code is further executable by said one or more processors to test said source code of said at least one module for errors, wherein said integrated software package is generated based on said testing of said at least one module.

19. The computer program product of claim 18, wherein said computer program code is further executable by said one or more processors to assign said confidence score to said source code of said at least one module based on said testing of said at least one module and a performance reputation score associated with said plurality of crowdworkers.

20. The computer program product of claim 19, wherein said computer program code is further executable by said one or more processors to create a second task corresponding to said at least one module when said confidence score is less than the predetermined threshold.

21. The computer program product of claim 20, wherein a response received for said second task comprises at least one of a second source code for said at least one module, a set of test cases for said at least one module, or a validation/verification of said source code of said at least one module.

22. The computer program product of claim 17, wherein said computer program code is further executable by said one Or more processors to assemble said integrated software package based on said validation of said integrated software package.

* * * * *